(12) United States Patent
Hoppenstein

(10) Patent No.: US 6,719,364 B2
(45) Date of Patent: Apr. 13, 2004

(54) VEHICLE CHASSIS AND BODY CONSTRUCTION

(76) Inventor: Reuben Hoppenstein, 200 Lyncroft Rd., New Rochelle, NY (US) 10804

( * ) Notice: Subject to any disclaimer, the term of this patent is extended or adjusted under 35 U.S.C. 154(b) by 0 days.

(21) Appl. No.: 10/266,453

(22) Filed: Oct. 8, 2002

(65) Prior Publication Data

US 2003/0030302 A1 Feb. 13, 2003

Related U.S. Application Data

(63) Continuation-in-part of application No. 09/739,723, filed on Dec. 18, 2000, now abandoned.

(51) Int. Cl.$^7$ ............................................. B60R 27/00
(52) U.S. Cl. .................. 296/203.01; 296/205
(58) Field of Search .................... 296/203.01, 204, 296/205, 203.02, 203.04, 203.03

(56) References Cited

U.S. PATENT DOCUMENTS

| | | | | |
|---|---|---|---|---|
| 3,881,765 A | * | 5/1975 | Cerra et al. ............... | 296/178 |
| 4,045,075 A | * | 8/1977 | Pulver ....................... | 296/205 |
| 4,553,783 A | * | 11/1985 | Lagana ...................... | 296/186 |
| 4,660,345 A | * | 4/1987 | Browning ................... | 296/205 |
| 4,810,028 A | * | 3/1989 | Henricks .................. | 296/203.01 |
| 4,828,017 A | * | 5/1989 | Watanabe et al. .......... | 296/205 |
| 4,971,378 A | * | 11/1990 | Setina ....................... | 296/24.1 |
| 5,725,270 A | * | 3/1998 | Fleishman .................. | 296/205 |

* cited by examiner

Primary Examiner—D. Glenn Dayoan
Assistant Examiner—Lori L Coletta
(74) Attorney, Agent, or Firm—Dickstein, Shapiro, Morin & Oshinsky, LLP.

(57) ABSTRACT

A personal conveyance is herein disclosed wherein a space frame or roll cage of an integral passenger and engine compartment is fabricated from at least two (2), preferably elliptical, roll bars that are directly or indirectly associated with a floor pan. In each case, at least one (1) roll bar is integral with and supportive of the perimeter of the floor pan and preferable permanently bonded (e.g. welded) thereto. A second, (and possible multiple roll bars), is then arranged inboard of said horizontal roll bar, in a linear array along the length of the vehicle, and at an inclined angle relative to the plane of the floor pan. The horizontal roll bar is affixed to the inclined roll bar at each point of intersection or coincidence thereof, so as to form an essential unitary structure or roll cage sufficient to accommodate both passenger and power plant compartments. This roll cage or X-O-Skeleton™-like structure is further modified on the inboard surface of the passenger and power plant compartments to receive and retain fasteners that are associated with body panels and windscreen/windows. The complimentary fasteners and fittings on such panels and inboard surfaces of the roll bars permit wind and water tight enclosure of the passenger and engine compartments defined by such roll cage or X-O-Skeleton™.

10 Claims, 2 Drawing Sheets

VEHICLE CHASSIS AND BODY CONSTRUCTION

RELATED APPLICATIONS

This application is a Continuation-In-Part of application, Ser. No. 09/739,723 now abandoned, filed Dec. 18, 2000, the entire contents of which is incorporated herein by reference.

FIELD OF THE INVENTION

This invention relates to an article of manufacture. More specifically, this invention relates to a unique vehicle spaceframe, and to the combination thereof with readily replaceable body panels. The vehicle of this invention is useful either as an individual or personal conveyance, or a car pool vehicle, to be used by commuters in a quasi-public transportation system.

DESCRIPTION OF THE PRIOR ART

The design and assembly of an inexpensive vehicular conveyance from interchangeable and readily replaceable parts has up to now proven to be an illusive, although highly desirable goal. The problems encountered typically involve the often conflicting objectives of reducing vehicle weight (to improve fuel economy), minimizing damage and cost of repairs (from impact related contact) and yet at the same time enhancing the safety of the vehicle passengers. All of the foregoing is to be achieved without sacrificing structural integrity. Various attempts have been made to achieve such objective such as by substituting different materials for part, or all of the vehicle frame. Although materials such as aluminum or composites have lightweight advantages, structural strength is typically sacrificed. Moreover, many substitute materials prove prohibitively expensive and, therefore, are not feasible.

The limitations on the substitution of such alternative materials are also directly related to vehicle assembly constraints. More specifically, conventional vehicle frame designs often dictate/limit the available options incident to the assembly process. For example, vehicle frames include forwardly extending midrails that protrude through the area that serves as the engine compartment. Assembly of the drivetrain and the front suspension system for the vehicle is more difficult because of the presence of these midrails. It would be advantageous, for example, to be able to completely assemble the suspension system before mounting it on the vehicle. Conventional frames, however, make such pre-assembly impractical or impossible.

Alternative structural systems and assembly methods for motor vehicle and other means of personal conveyance have been disclosed in both the press, trade journals, technical and patent literature. The following prior art is representative of such past efforts.

U.S. Pat. No. 4,217,970 (to Chika, issued Aug. 19, 1980) discloses and claims a configuration and construction of four-wheeled motor vehicles. It is indicated at column 2, lines 9–21 of the patent that an objective is to create entirely new type of motor vehicle by producing rigid left and right vehicle sides using either tubular construction or large, specifically reinforced stampings or molded panels of synthetic materials and transversely interconnecting them by the torsionally resilient members to create a light vehicle chassis and body structure and covering the spaces between thus interconnected sides with hood, roof and trunk panels of any suitable materials to enclose and protect thus configured body from elements and pilferage as is presently done with existing motor vehicles.

U.S. Pat. No. 6,017,084 (to Carroll et al, issued Jan. 25, 2000) describes an energy absorbing lattice for incorporation within automotive vehicle body panels. The objective of the Carroll invention is to improve crash test performance and passenger safety and yet permit elimination of much of the conventional frame and passenger cage commonly utilized to support and protect the vehicle's occupants. According to the Carroll concept, a reinforcing energy absorbing member is laminated to the inner face of a "contact surface" (automobile body panel) in a manner and configuration calculated to optimize absorption/dissipation of impact energies to the contact surface. The reinforcing energy absorbing member, unlike the so-called crush boxes typically found in bumpers, is composed of an interconnected lattice of a molded or fabricated mass of steel, plastic, or composite thereof, which defines a plurality of cells. The foregoing configuration reportedly enhances the crash worthiness of the vehicle, thus, permitting reduction in size and in some cases elimination of energy absorbing pillars and headrails.

U.S. Pat. No. 6,010,182 (to Townsend et al, issued Jan. 4, 2000), describes a unique chassis and body panel combination for various conveyances, e.g. cars, boats, aircraft and personal "people power vehicles" (also PPV). The Townsend "system" utilizes a module or spaceframe and body panel wherein each of the frame and panels have complimentary fittings to firmly engage the panel to the frame. The complimentary fittings are releasable, to allow for change or replacement of a given panel; or to allow for change or replacement of all, or a group of panels, so as to modify the utility or appearance of the vehicle. The Townsend module or spaceframe closely resemble the traditional unibody vehicle construction, through its utilization of a series of welded pillars and posts to define a passenger and engine compartment. The Townsend invention, reportedly represents a substantial improvement in ease of vehicle manufacture, without sacrifice in structural stiffness and durability of the frame. Moreover, the design freedom afforded by the Townsend invention also reportedly permits for improved passenger safety through such enhancements in the design of the car body frame.

Notwithstanding the strides made in the prior art, including those specifically referenced and discussed herein, there is a continuing need to further enhance passenger safety, without compromise of fuel economy or added expense. To the extent that each of the Chika, Carroll and Townsend concepts have made certain strides in that direction, each is limited by introduction of complexities that require relatively substantial departures from traditional manufacturing process and materials, and, thus, have not been adopted to any substantial degree. Moreover, while each of the directions taken by Chika, Carroll and Townsend to improve vehicle performance and manufacture, are laudable, they appear to be impractical for application to problems associated with personal conveyance of large populations of individuals at relatively modest cost (approaching that of public transportation).

OBJECTS OF THE INVENTION

It is the object of this invention to remedy the above as well as related deficiencies in the prior art.

More specifically, it is the principle object of this invention to provide a personal conveyance that can meet the needs of the urban commuter at a fraction of the cost of present day automobiles.

It is another object of this invention to provide a personal conveyance that is part of a pool of essential identical and interchangeable commuter cars, so as to permit their use as integral part of a mass transit system.

It is yet another object of this invention to provide a method for the fabrication of a personal conveyance that has both the integrity and rigidity of larger and heavier vehicles.

A further object of this invention is to provide a personal conveyance which can have from two wheels (i.e., scooters, bicycles, and the like) to four or more wheels (i.e., larger and heavier vehicles). Another object is to provide a three-wheel vehicle with a single wheel in the front or back and the other two at the other end of the vehicle.

It is still yet another object of this invention to provide a vehicle having enhanced protection of its body panels from damage and yet readily replaceable in the event of collision or abuse.

Additional objects of this invention include the adaptation of the conveyance of this invention to both gasoline and electric power, and to hybrid power plants.

SUMMARY OF THE INVENTION

The above and related objects are achieved by providing a personal conveyance wherein a space frame is fabricated from at least two (2), preferably elliptical, roll bars that are directly or indirectly associated with a floor pan, so as to define an integral occupant and power plant compartment. The roll bar cross-section can be either circular or rectangular. In each case, at least one (1) roll bar is integral with and supportive of the perimeter of a floor pan and preferable permanently bonded (e.g. welded) thereto. The preferred space frame contemplates that a second, essentially horizontally disposed, roll bar be positioned relative to the first roll bar and floor pan, at approximately midway between the plane of the floor pan and the top of the vehicle. An optional third, (and possible multiple rolls bars), is then arranged, inboard of each of the first and second horizontal roll bars, in a linear array along the length of the vehicle, and at an inclined angle relative to the plane of the floor pan. Each of the two horizontal roll bars are affixed to the inclined roll bar(s) at each point of intersection or coincidence thereof, so as to form an essential unitary structure or cage sufficient to accommodate both passenger and power plant (battery) compartments. This cage or X-O-Skeleton™-like structure is further modified on the inboard surface of the passenger and power plant compartments to receive and retain fasteners that are associated with body panels and windscreen/windows. The complimentary fasteners and fittings on such panels and inboard surfaces of the roll bars permit wind and water tight enclosure of the passenger and engine compartments defined by such cage or X-O-Skeleton™.

Attachment of the body panels is made from the inside of the X-O-Skeleton™ structure so the panels cannot be removed from the outside, thus preventing theft. Also, the roll bars can be coated with rubberized paint, or other protective material, and the electrical harness for the vehicle can be placed within the roll bars.

In one of the preferred embodiments of the invention, the vehicle is powered by a conventional gasoline engine. In another of the preferred embodiments, the vehicle is power by electric motors mounted in each of the drive wheels, and electrical power supplied by a hybrid power plant (fossil fuel and battery power).

DETAILED DESCRIPTION OF THE PREFERRED EMBODIMENTS

This invention relates to a space frame and body panel structure for a wide variety of vehicles, including automobiles, motorcycles, water vessels, aircraft and human powered vehicles, such as scooters, bicycles or tricycles, principally comprising a unitary roll cage and floor pan.

Figure 1:
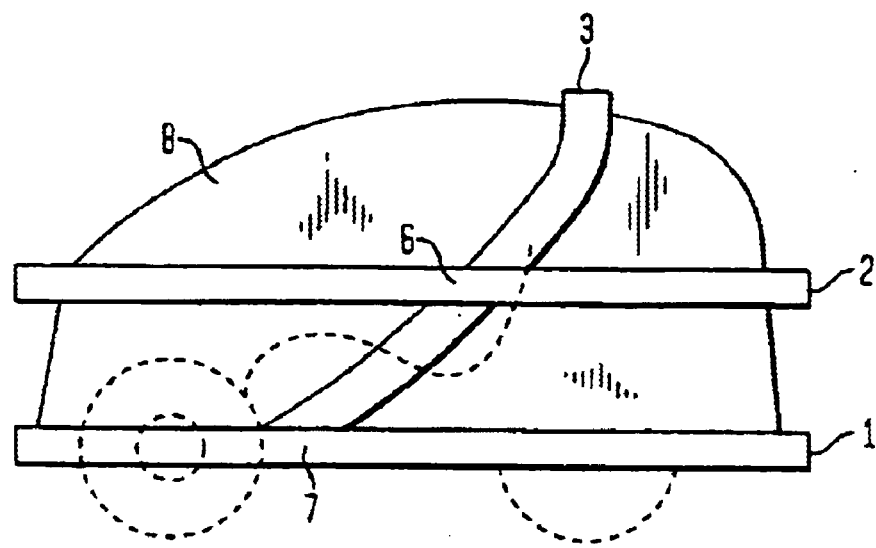
FIG. 1 is perspective of a preferred embodiment of the vehicle of this invention.
Figure 2:
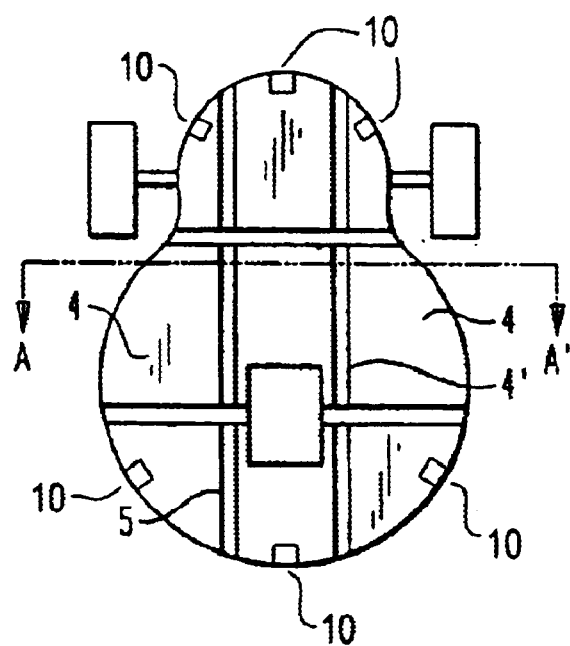
FIG. 2 is planar view of the floor pan of the vehicle of the FIG. 1.
Figure 3:
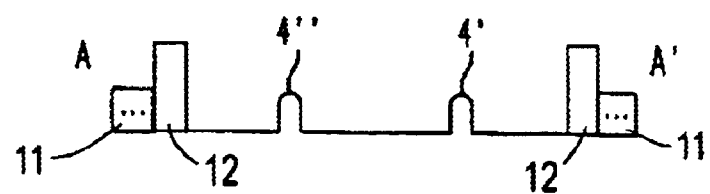
FIG. 3 is a cross-sectional view of the floor plan of FIG. 2 at AA

FIG. 1 depicts the invention in its simplest embodiment. In the configuration thereof illustrated therein, three roll bars (1,2,3) are shown to form an integral cage or spaceframe. It is to be understood that at least two roll bars are required, one horizontal and one vertical, but that multiple roll bars could be used. Each of the roll bars are essentially elliptical and associated either directly or indirectly with each other and a floor pan (4) (see FIG. 2). In the embodiment of the invention illustrated in FIG. 1 and more particularly in FIG. 2, a first horizontal roll bar (1) is integrally joined to a floor pan (4) at the perimeter thereof so as to afford both enhanced structural integrity to the floor pan and a more substantial mass of material to which other vehicle components can be affixed (e.g. steering mechanism, front and rear suspension, power plant, etc.). The floor pan (4) may, by design, comprise molded material which could include "corrugation-like" structures (5) or "folds" (4',4") to further enhance its rigidity and torsional stability. This is illustrated in FIG. 3. In the embodiment of the invention illustrated in FIG. 1, a second horizontal roll bar (2) is shown to be positioned about mid-way between the floor pan and the top of the vehicle, or approximately at the "belt-line" level of the vehicle. The relative position of this second horizontal roll bar (2) is intended to afford protection to passengers from side impact collisions. A third roll bar (3) is also utilized in the vehicle illustrated in FIG. 1. This third roll bar is inclined at an angle relative to the plane of the floor pan, and located inboard of each of the horizontally disposed roll bars (1,2). This inboard roll bar can be affixed to each of the horizontally positioned roll bars at the intersection thereof (6,7) by welding or other semi-permanent attachment.

Figure 4:
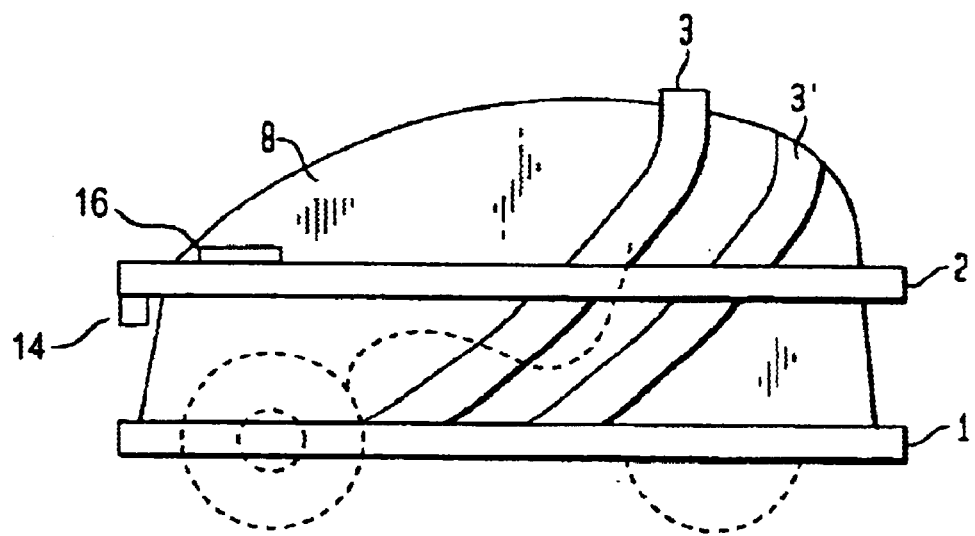
FIG. 4 is a perspective view of a stretch version of the vehicle of FIG. 1.

In another of the alternative embodiments of the vehicle illustrated in FIG. 4, an array or series of inboard roll bars (3,3') are arranged along the length of the vehicle to provide additional dimensional support and passenger compartment capacity. Essentially the same relationships of the various component parts are maintained in FIG. 4 as in FIG. 1, without departure from the basic concept or advantages of the invention.

It is to be understood that body panels (8), FIG. 1, are attached to the inside of roll bars 1, 2 and 3. The body panels are designed to be easily removable from the inside (but not the outside) of the vehicle, and can be provided in various colors and finishes. If damaged, the body panels can be easily replaced and, of course, must be attached in a manner that will make the vehicle water proof. Design and attachment of such panels, which would include windows and doors of the vehicle, would be apparent to one skilled in the automotive area and, thus, will not be further described herein.

While the roll bars can have a circular cross-section, i.e., of tubular configuration, in a preferred embodiment at least a portion or the entire length of the roll bar can be rectangular in shape, thus, by having the X-O-Skeleton™-like structures of a rectangular shape, the panels can be attached to a flat rather than curved surface and, thereby, provide a better fit and are removed more easily. For example, the rectangular configuration of the roll bar, lends itself to easier attachment of the floor pan and panels using recessed bolts and/or machine screws (10). If a panel should need replacement, it can easily be removed and replaced from the inside with a screwdriver by the vehicle owner or other person.

As indicated above, and shown in FIG. 3 the roll bars can also serve as conduits for wiring (11), electrically operated to safety harnesses (12), as well as attachment points for mudguards, lights (14), roof, panels, windshield wipers (16), and the like. As noted, the rectangular cross-section of the roll bars makes it easier to attach various components of the vehicle. In some instances, the rectangular shape of the roll bar may provide greater resistance to bending and distortion than the cylindrical cross-sectional configuration.

As indicated previously, the roll bars can be covered with a inert, protective material such as a rubberized or synthetic coating for protection of the metal and also as a safety feature.

The self-propelled conveyance of the present invention provides an ideal method of commuting, going to the supermarket, train station and the like. The Exoskeleton can be coated with a rubberized paint which will not flake on impact and can be easily touched-up. The roll bars can have preset bolts on the inner surface for ease of attachment of panels, doors and the like.

The conveyance can be fabricated from inexpensive and lightweight materials such as aluminum, and plastics. If constructed as a three-wheeler with an extra wide third wheel, the vehicle is stable and can rotate on its own footprint. Since the engine is rear mounted with direct drive to the rear wheel(s), there is a savings in fuel. The interior can be kept simple with no need for fancy padding on the interior. All in all, the conveyance of this invention provides an inexpensive and simple means for local transportation.

The foregoing description of this invention has been provided as illustrative of a number of the preferred embodiments thereof, and is not intended as defining the metes and bounds of the invention, which has been reserved for the following claims.

What is claimed is:

1. In a self-propelled conveyance having a space frame, which includes a roll cage and a floor pan, for defining a compartment for carrying passengers and a power plant, and means for protection of said passengers from the elements and possible injury from collision, the improvement comprising:

the space frame comprising at least two essentially elliptical roll bars and the floor pan, wherein one of said horizontally disposed roll bars is integrally bonded to said floor pan at the perimeter thereof, and at least one additional roll bar positioned inboard of said horizontal roll bars and at an inclined angle relative to said floor pan; and means for connecting said horizontal roll bars to said inclined roll bar at each intersection point thereof, whereby the interconnecting horizontal and inclined roll bars form an exo-skeleton around the compartment, and create a non-compressible occupant compartment of a rigid, unified structure.

2. The improved self-propelled conveyance of claim 1, wherein said space frame comprises a plurality of inclined roll bars arranged in a linear array along the length of said conveyance.

3. The improved self-propelled conveyance of claim 1, wherein said space frame includes means for attachment of body panels, doors and windows to the interior side of said roll bars of said space frame so as to define a compartment that is essentially isolated from wind and weather.

4. The improved self-propelled conveyance of claim 1, wherein said space frame includes a floor pan having an integral array of structural reinforcement formed therein.

5. The improved self-propelled conveyance of claim 4, wherein said floor pan includes integral structural reinforcement formed in an array of preformed beams at rights angles to one another.

6. The improved self-propelled conveyance of claim 1, wherein at least some portion of the roll bars is circular in cross-section.

7. The improved self-propelled conveyance of claim 1, wherein at least some portions of the roll bars are rectangular in cross-section.

8. The improved self-propelled conveyance of claim 1, wherein at least some of the roll bars are coated with a protective material.

9. The improved self-propelled conveyance of claim 2, wherein body panels, doors and windows are attached to the interior side of the roll bars by means which allow easy removal and reinstallation or replacement by an unskilled person.

10. The improved self-propelled conveyance of claim 1, wherein the roll bars also serve as conduits for wiring, electrically operated seat belt harnesses, lights, and attachment of panels, doors, windscreens, and windshield wipers.

* * * * *